United States Patent

Albertazzi

[11] 3,943,632
[45] Mar. 16, 1976

[54] APPARATUS FOR MEASURING THE LENGTH OF CURVILINEAR SEGMENTS

[75] Inventor: Gastone Albertazzi, Bologna, Italy

[73] Assignee: Finike Italiana Marposs, Soc. In Accomandita Semplice di Mario Possati & C., Bentivoglio, Italy

[22] Filed: Aug. 28, 1974

[21] Appl. No.: 501,338

[30] Foreign Application Priority Data
Sept. 4, 1973  Italy .................................. 3488/73

[52] U.S. Cl. ............................. 33/174 L; 33/143 L
[51] Int. Cl.² ....................... G01B 7/00; G01B 7/02
[58] Field of Search .......... 33/143 R, 143 L, 147 N, 33/174 R, 174 L; 209/88 R

[56] References Cited
UNITED STATES PATENTS

| | | | |
|---|---|---|---|
| 1,554,031 | 9/1925 | Reeves .............................. | 33/174 R |
| 2,523,555 | 9/1950 | Boosey ............................. | 33/143 L |
| 2,911,728 | 11/1959 | Mundell et al. .................... | 33/174 R |
| 3,550,279 | 12/1970 | Fapiano ............................ | 33/143 L |
| 3,562,918 | 2/1971 | Ertman et al. ..................... | 33/174 L |

FOREIGN PATENTS OR APPLICATIONS

| | | | |
|---|---|---|---|
| 866,401 | 7/1949 | Germany ........................... | 33/174 L |

Primary Examiner—Houston S. Bell, Jr.
Assistant Examiner—Richard R. Stearns
Attorney, Agent, or Firm—Stevens, Davis, Miller & Mosher

[57] ABSTRACT

An apparatus for measuring the length of curved segments including loading pairs of rollers with one roller of each pair being driven, positioning switches, positioning shaped reciprocally movable elements defining a hollow to house the segment to be measured and movable arms and feelers to measure the segment. The hollow has a shape corresponding to the theoretical shape of the segment. The movable elements are fitted with openings for at least one of the ends of the segment. The feelers are arranged in correspondence with the openings to cooperate with the relevant ends of the segment.

11 Claims, 2 Drawing Figures

APPARATUS FOR MEASURING THE LENGTH OF CURVILINEAR SEGMENTS

This invention relates to an apparatus for measuring the length of curved segments, with small transversal sizes with regards to the length, in particular of the segments used as side seals in the rotor of a rotating "Wankel" engine.

In this type of engine one of the most difficult problems to solve is to ensure the sealing between the rotor, which in its transversal section has the shape of a convex triangle with the sides curved according to a circumferential arc, and the stator having the shape of an epitrochoid.

The sealing has to be ensured both along the corners parallel with the axis of rotation, for this purpose rectilinear segments are used, and along the side walls of the rotor and stator, where curvilinear segments perform this task. These segments are housed in grooves shaped as a circumferential arc made in the rotor concentrically with its sides and at a small distance from them. To ensure a good sealing near the apexes too, cylindrically-shaped seals are used, contained in appropriate seats on which the ends of the side segments abut.

Obviously, to attain good sealing, it is important that these seals perfectly fit the shape and the length of the relevant grooves, in which they are inserted.

It is therefore an object of the present invention to provide an apparatus for quickly and accurately measuring the length of curvilinear segments of a preset curving.

It also is a special object of the present invention to make an apparatus adapted to measure the length of the side seals of Wankel rotors so that their fitting with the relevant seats or grooves can be effectively checked.

These and other objects and advantages of the invention will result from the following description of an apparatus for measuring the length of curved segments including loading means, positioning means, unloading means for the segments to be measured, measuring means with moving arms and direct contact feelers. According to the present invention the positioning means are formed by at least two shaped reciprocally moving elements, adapted to define a hollow to house the segment to be measured. The hollow has a shape corresponding to the theoretical shape of the segment and is fitted with openings for at least one of the ends of the segment. The feeler or feelers of the moving arms is or are arranged in correspondence with the openings to cooperate with the relevant end, or ends, of the segment.

The loading, positioning and unloading means include operating devices to successively displace the shaped elements to a loading, measuring and unloading position of the segments.

The invention now will be described in more detail with reference to the attached drawings given by way of a nonlimiting example in which equal or equivalent parts are marked by the same reference numerals.

Figure 1:
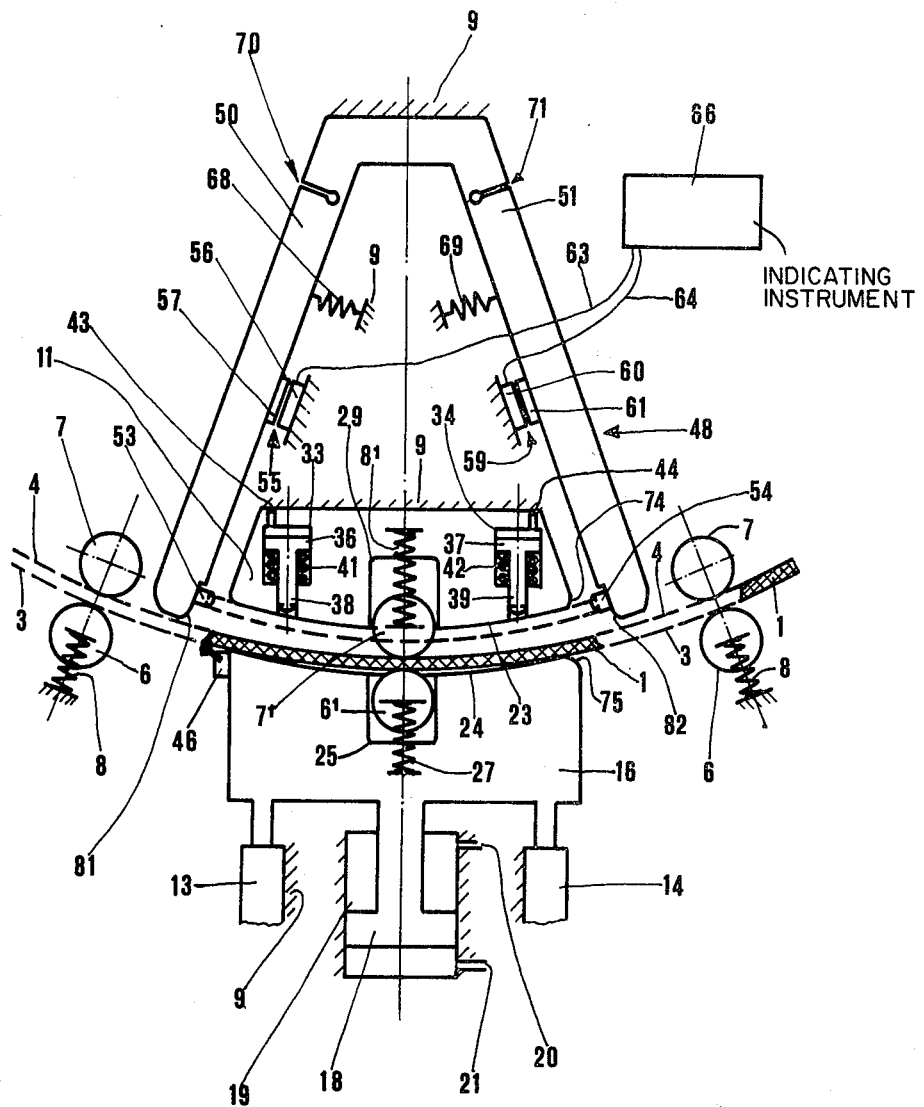
FIG. 1 shows a schematic transversal view of an embodiment of the apparatus according to the present invention.

In FIG. 1 are indicated by 1 the segments to be measured, consisting in side seals of Wankel rotors.

Dashed lines 3, 4 represent guides to bring segments 1 to the measuring position and to unload them.

Guides 3, 4 have interruptions, and pairs of rollers 6, 7 pass through them.

Rollers 6 are idle, whereas driving rollers 7 are operated by motors and drive means not represented in FIG. 1.

The axes of rollers 6 are displaceable, so that they move away from or approach the axes of the corresponding rollers 7 and are associated with pressure springs 8.

A frame 9, shown very schematically, supports an upper shaped element 11 and, by means of vertical guides 13, 14 a lower shaped element 16 consisting in a slide which can move along guides 13, 14 under the action of piston 18 of a pneumatic double-acting cylinder 19 having two pipes 20, 21.

The facing surfaces 23, 24 of upper shaped element 11 and of slide 16 have respectively a convex and a concave shape with profiles as a circumferential arc.

The relevant curving centers coincide when the surfaces are in a measuring position and segment 1 is clamped therein.

The length of the two surfaces 23, 24 is advisably smaller than the nominal length of segment 1, so that the latter, while being measured, projects at both sides of surfaces 23, 24, as explained hereinafter.

Surfaces 24 defines a hollow 25 in which there is an idle roller 6' whose axis can move vertically and is associated with a pressure spring 27.

Surface 23 also defines a hollow 29 in which there is a roller 7' whose axis can move vertically and is associated with a pressure spring 8'.

Roller 7' is connected through proper not shown joints with the operating drive of rollers 7.

In upper shaped element 11 there are pneumatic cylinders 33, 34 with pistons 36, 37 associated with relevant ejection rods 38, 39 and return springs 41, 42.

The feeding of cylinders 33, 34 takes place by pipes 43, 44.

The microswitch 46 operated by the coming segment 1, is fixed to a side of slide 16.

Frame 9 supports a measuring head 48 formed by two arms 50, 51 bearing direct contact feelers 53, 54 at their ends.

With arm 50 there is associated a position transducer 55, comprising a fixed armature 56, and a mobile armature 57. With arm 51 there is associated a position transducer 59 including a fixed armature 60 and a mobile armature 61.

Through cables 63, 64 transducers 55, 59 are connected to an indicating instrument 66.

Arms 50, 51 associated with return springs 68, 69 can perform small rotational motions around fulcra 70, 71 which are obtained by making a transverse cut and a hole in arms 50, 51 to reduce their sections to a flexible leaf spring.

Figure 2:
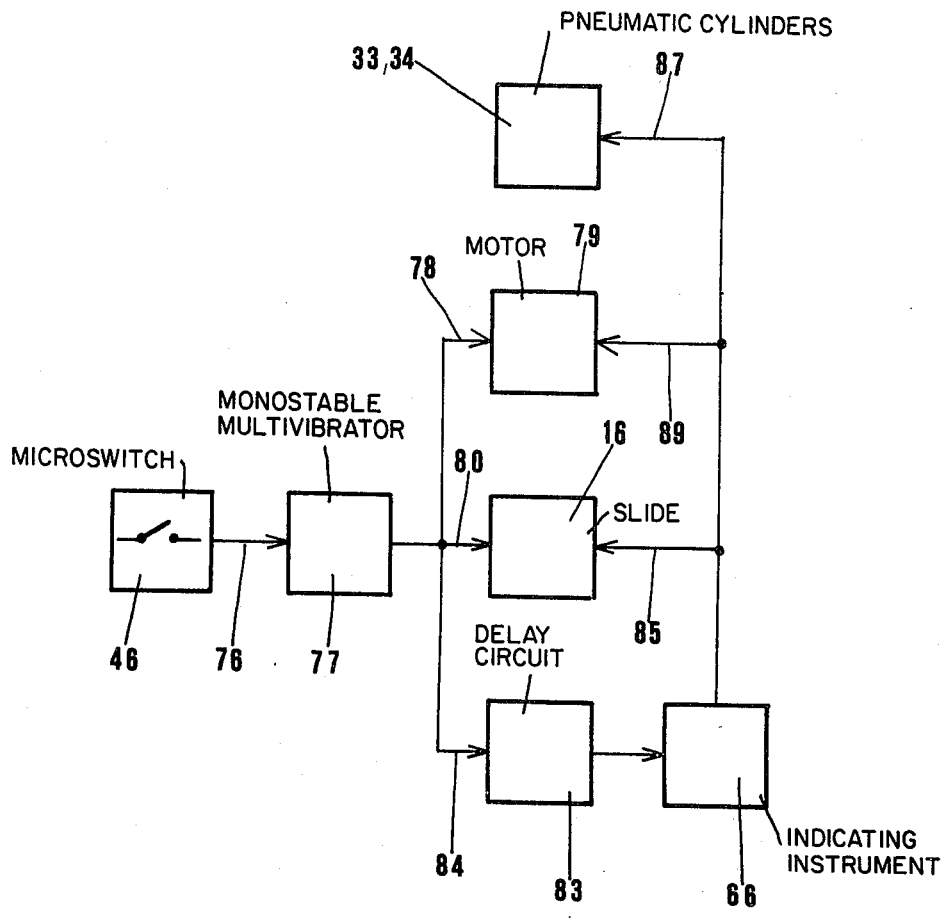
FIG. 2 shows a block diagram of the apparatus of FIG. 1.

The block diagram of FIG. 2 illustrates the control circuits and the working of the apparatus of FIG. 1.

Segments 1, pushed on by rollers 7, slide at some distance from one another along input guides 3, 4.

When a segment 1 comes to the input side of surfaces 23, 24, slide 16 is at the farthest position from surface 23 and is kept there by double-acting cylinder 18 which receives air under pressure from pipe 20.

It may be noted that surfaces 23, 24 present input chamfers 74, 75 to facilitate the entry of segment 1.

Segment 1 is pushed on, by the action of roller 7' too, until its front end closes microswitch 46.

Microswitch 46 is associated, through a line 76, to an electronic circuit including a monostable multivibrator 77 which commutates at the closure of microswitch 46, supplying an output pulse through a line 78.

The output pulse of multivibrator 77 brings about the stopping of motor 79 (FIG. 2) operating rollers 7, 7'.

At the same time, by means of a line 80 and a valve not shown this pulse controls the lifting of slide 16, as a result of the inlet of air under pressure into double-acting cylinder 19 through pipe 21.

The lifting of slide 16 causes the hoisting of segment 1 which remains clamped between surfaces 23, 24 in the position shown by a dashed line in FIG. 1, assuming a shape and curving corresponding to those assumed when it is inserted in the relevant grooves of the Wankel rotor.

While slide 16 is lifting clamping segment 1 springs 27, 8' are compressed and rollers 6', 7' return into hollows 25, 29.

The lifting of segment 1 makes its ends come between the ends of moving arms 50, 51 which present input chamfers 81, 82.

Therefore segment 1 causes the opening of moving arms 50, 51 and its ends getting into touch with feelers 53, 54.

The latter have such a profile as to reproduce the contact conditions of segment 1 with the cylinders of the rotor. After this phase indicating instrument 66 is enabled by a delay circuit 83 operated by multivibrator 77 through a line 84.

Delay circuit 83 supplies a delay sufficient to ensure the fulfillment of the already described operations following the closure of microswitch 46, and, additionally, to ensure that feelers 53, 54 steadily contact the ends of segment 1.

The position of microswitch 46 is such that segment 1, when it stops, is arranged in a substantially symmetrical way, so that its ends project by the same quantity at both ends of surfaces 23, 24 (obviously this is only approximately true; as a matter of fact, if every segment 1 is assumed to stop when its left end is at a constant distance from microswitch 46 the position of the other end depends on the length of the segment itself). Therefore the insertion of the ends of segment 1 between feelers 53, 54 is easy and the distances of mobile armatures 57, 61 of transducers 55, 59 from the corresponding fixed armatures 56, 60 are not too different from one another.

Detecting the measurement foresees the processing of the signals supplied by transducers 55, 59. The signals are indicative of the openings of moving arms 50, 51 with respect to reference or "zero" openings achieved when a master piece is arranged in the measuring position.

As segment 1 being clamped between surfaces 23, 24 is compelled to assume a set shape, the processing of the same signals directly provides the length of segment 1 measured.

After the measurement, a pulse supplied by instrument 66 initiates the unloading phases of segment 1.

The pulse causes (functional connection 85) the lowering of slide 16, controlling the air supply under pressure to cylinder 19 through pipe 20.

The same pulse brings about the operation of valves not shown which allow air under pressure to enter cylinders 33, 34 for some time and thereby control a downward stroke of ejection rods 38, 39 that push segment 1 from arms 50, 51 and arrange it on slide 16 (functional connection 87).

Finally, the same pulse controls (functional connection 89) the starting of motor 79 operating driving rollers 7, 7' so that an already measured segment 1 is moved away from the measuring apparatus and a successive segment 1 comes between surfaces 23, 24.

When the right end of the already measured segment goes beyond microswitch 46, the latter opens again and then closes at the arrival of successive segment 1, initiating in this way a new operative cycle of the apparatus.

As already seen, the apparatus of FIG. 1 includes two moving arms 50, 51 with relevant position transducers 55, 59.

Obviously it is also possible to use a single transducer with both moving armatures, each of them being associated to an arm.

The apparatus can be changed so that only one of its arms is moving whereas the end of the other fixed arm acts as a reference abutment for an end of segment 1. According to another variant this fixed arm can be eliminated and replaced by a reference ledge associated, for instance, to upper surface 23.

In such a case surfaces 23, 24 can be modified so that, when closed, they present only one end opening for the passage of an end of segment 1 (on which the only feeler of the apparatus acts) while the other end of the segment is clamped between the two surfaces.

To assure an exact arrangement of segment 1 on surfaces 23, 24 the latter can present slots adapted to guide and house the segments themselves.

The apparatus can be finally provided with per se known devices for grading the measured segments in different classes according to their length and with marking devices, known per se, adapted to mark the segments by means of symbols representative of the classes to which they belong.

Obviously, in addition to the modifications and variants mentioned above, other changes can be made being equivalent from the functional and structural point of view, without going beyond the scope of the invention.

What is claimed is:

1. An apparatus for measuring the length of curved segments, comprising:
   a frame;
   positioning means, carried by the frame, including: two shaped elements adapted to define a housing for the segment to be measured, said housing having a shape corresponding to the theoretical shape of the segment and defining two openings for the passage of the ends of the segment; and means for successively displacing said shaped elements from a position for receiving a segment to a measuring position and back to said receiving position for removal of the measured segment; measuring means, carried by the frame, including two movable arms with contact feelers for contacting, respectively, the ends of the segment projecting through said openings in said measuring position, located intermediate said arms; means for biasing the feelers towards the ends of the segment and transducer means for providing a signal responsive to the mutual distance of the feelers.

2. The apparatus according to claim 1, for measuring the side seals of Wankel rotors, wherein said two shaped elements have facing opposite surfaces for defining said housing, one of the surfaces being concave, the other convex, with profiles as circumferential arcs, one of the elements being fixed to the frame and the other element being movable with respect to the frame, and wherein the centers of curvature of said profiles are coinciding in said measuring position of the two shaped elements.

3. The apparatus according to claim 1, wherein said movable arms are pivotally mounted on said frame, said transducer means comprises two transducers, each transducer being operatively connected to a relevant arm to provide a signal depending on the arm position, and said means for biasing comprises return springs for urging the arms towards each other.

4. The apparatus according to claim 1, further comprising loading means carried by the frame for acting on the segments to be measured to make the same enter between said shaped elements by passing through one of said openings, and unloading means carried by the frame for acting on the measured segments to remove them away from said shaped elements, through the other opening.

5. The apparatus according to claim 4, further comprising control means operatively connected to said positioning means, measuring means, loading means and unloading means for automatically controlling their operation to successively move a first segment from the receiving position to the measuring position, measure said segment, move said segment back to said receiving position, unload said segment, and load a second segment into said receiving position, said control means including a switching device having a control member arranged adjacent one of said shpaed elements to be actuated by the segment to be measured to initiate said automatic operation.

6. The apparatus according to claim 5, wherein said control means comprises first circuit means operatively connected to said switching device and loading means for arresting the operation of the loading means; and second circuit means operatively connected to said switching means and positioning means for controlling the displacement of said shaped elements to the measuring position.

7. The apparatus according to claim 6, wherein said control means comprises a delay circuit connected between said switching device and the measuring means, to control the detecting of the measurement by the measuring means, upon reaching said measuring position of the shaped elements.

8. The apparatus according to claim 7, wherein said control means comprises third circuit means operatively connected to said measuring means and positioning means for controlling the displacement of said shaped elements to the receiving position, upon the detecting of the measurement by the measuring means; and fourth circuit means operatively connected to said measuring means, unloading means and loading means for starting the operation of the unloading means and loading means upon said detecting of the measurement.

9. The apparatus according to claim 4, wherein said loading means and unloading means include guides and pairs of rollers, every pair being formed by a driving roller operated by driving means and an idle roller, at least one pair of rollers being housed in recesses defined in said shaped elements.

10. The apparatus according to claim 9, wherein at least one roller of every pair is displaceable toward and away from the other roller in a direction perpendicular with its axis and is coupled to resilient means adapted to bias it towards the other roller of the pair.

11. The apparatus according to claim 1, wherein said positioning means includes movable ejection means for ejecting the measured segments away from said contact feelers and toward said receiving position.

* * * * *